3,089,888
SULFATES OF ALKENOXYLATED BUTYNEDIOL
Raymond L. Mayhew, Summit, N.J., and Earl P. Williams, Pen Argyl, Pa., assignors to General Aniline & Film Corporation, New York, N.Y., a corporation of Delaware
No Drawing. Filed May 5, 1961, Ser. No. 107,938
5 Claims. (Cl. 260—458)

This invention relates to a new class of sulfates of alkenoxylated butynediol having utility as electroplating additives, rust and corrosion inhibitors.

Alkynoxy sulfonic acids and their salts are known and readily prepared by the condensation of an isethionic acid salt with 1,4 dichloro-butyne. The salts are useful in bright nickel plating.

We discovered that sulfates of alkenoxylated butynediol are not only excellent electroplating additives, but also useful as rust and corrosion inhibitors. These sulfates are prepared by condensing 1 mole of 1,4-butynediol with 2 to 4 moles of either ethylene oxide or propylene oxide in the conventional manner and reacting one mole of the condensate with one or two moles of sulfonic acid at a temperature of 110–140° C. to form the ammonium salt which, if desired, may be readily converted to a number of different salts by the addition of a stronger base such as, for example, sodium hydroxide, potassium hydroxide, calcium hydroxide, magnesium hydroxide, strontium hydroxde, lithium hydroxide, cobaltous hydroxide, barium hydroxide, propylamine, etc.

The nature or character of the strong base, i.e. whether inorganic or organic, is immaterial so long as it is capable of conversion into a salt.

The sulfates thus prepared are characterized by the following general formula:

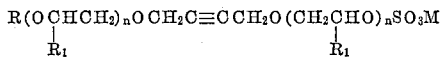

wherein M represents either hydrogen, alkali metal, alkaline earth metal, ammonium or an alkylamino group of from 1 to 12 such as methylamine, ethylamine, butylamine, tert butylamine, propylamine, isopropylamine, amylamine, hexylamine, n-decylamine, n-dodecylamine, etc., $n$ represents an integer of from 1 to 2, R represents either hydrogen or $SO_3M$ group with M of the same value as heretofore, and $R_1$ represents either hydrogen or methyl group.

The following examples will illustrate the preparation of the new class of sulfates of alkenoxylated butynediol of the foregoing general formula and their utility. All parts given are by weight.

*Example I*

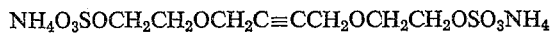

Into a 500 ml. round bottom flask equipped with a thermometer, stirrer, condenser and powder funnel were charged 52.2 parts of the reaction product obtained by condensing 1 mole of 1,4-butynediol with 2 moles of ethylene oxide and the contents heated to 115° C. Thereafter, 64 parts of powdered sulfamic acid were added through the powder funnel over a period of 45 minutes. The reaction mixture was then held for an additional 1 hour and 15 minutes at 115° C. The contents of the flask were then cooled to 100° C. and 50 parts of water added to form a dark liquid product.

Analysis for unreacted hydroxyl content showed an OH number of 48.5 mg. of potassium hydroxide per gram. This corresponds to a conversion of 75% of the total OH charged.

*Example II*

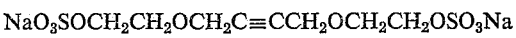

348.4 parts of the condensation product of 1 mole of 1,4-butynediol with 2 moles of ethylene oxide were heated to 115° C. and 388 parts of sulfamic acid added over a period of 2 hours while allowing the temperature to rise to 137° C. The reaction was held an additional 2 hours at 120–135° C. and then cooled to 100° C. 160 parts of sodium hydroxide dissolved in 320 parts of water were then added at 100–60° C. over a period of 45 minutes and the ammonia removed by heating to 75° C. at 30 mm. Enough water was then replaced to bring the total weight to 1475 parts. The dark liquid product was submitted for a total amine analysis and none was found.

*Example III*

348.4 parts of the condensation product of 1 mole of 1,4-butynediol with 2 moles of ethylene oxide were heated to 120° C. and 194 parts of sulfamic acid added over a period of 1½ hours at 120–135° C. The reaction was held an additional two hours at 130–115° C. and then cooled to 100° C. 80.0 parts of sodium hydroxide dissolved in 160 parts of water were then added over a period of ½ hour at 100–50° C. The ammonia was removed by heating to 75° C. at 30 mm. Enough water was then replaced to bring the total weight to 1108 parts.

The OH No.=123 mg. KOH/g. This corresponds to a conversion of 82% to the monosulfate.

*Example IV*

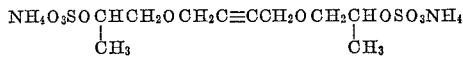

60.6 parts of the condensation product of 1 mole of 1,4-butynediol with 2 moles of propylene oxide were reacted with 64 parts of sulfamic acid in accordance with the procedure of Example I.

The products of Examples I to IV, which are free from sodium chloride, are not only excellent rust and corrosion inhibitors but excellent electroplating additives for obtaining bright ductile plate from acidic nickel baths of the Watts type. For the latter purpose, they may be used in the concentration of about 0.04 to 0.12 gram per liter of electroplating bath at a pH of 2.5 to 4, a temperature of 45° C. to 80° C. in a cathode current density of 1 to 10 amps./sq. dm. in any one of the conventional nickel-plating baths of the Watts type. The additives may also be employed in copper-plating baths wherein cyanides are used at a pH of 13.3.

We claim:

1. Sulfates of alkenoxylated butynediol having the following general formula:

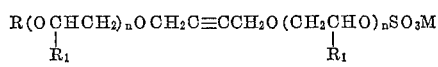

wherein M represents a member selected from the class consisting of hydrogen, alkali metal, alkaline earth metal, ammonium and alkylamino group of from 1 to 12 carbon atoms, $n$ represents an integer of from 1 to 2, R represents a member selected from the class consisting of hydrogen and $SO_3M$, and $R_1$ represents a member selected from the class consisting of hydrogen and methyl group.

2. A salt of a sulfated alkenoxylated butynediol having the following formula:

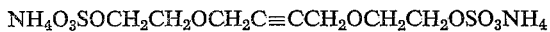

3. A salt of a sulfated alkenoxylated butynediol having the following formula:

$$NaO_3SOCH_2CH_2OCH_2C\equiv CCH_2OCH_2CH_2OSO_3Na$$

4. A salt of a sulfated alkenoxylated butynediol having the following formula:

$$HOCH_2CH_2OCH_2C\equiv CCH_2OCH_2CH_2OSO_3Na$$

5. A salt of a sulfated alkenoxylated butynediol having the following formula:

$$NH_4O_3SO\underset{\underset{CH_3}{|}}{C}HCH_2OCH_2C\equiv CCH_2OCH_2\underset{\underset{CH_3}{|}}{C}HOSO_3NH_4$$

References Cited in the file of this patent

UNITED STATES PATENTS

| | | |
|---|---|---|
| 2,800,440 | Brown | July 23, 1957 |
| 2,882,208 | Becking et al. | Apr. 14, 1959 |
| 2,998,360 | Castellano | Aug. 29, 1961 |

FOREIGN PATENTS

| | | |
|---|---|---|
| 864,287 | Great Britain | Mar. 29, 1961 |